United States Patent [19]
Eckhout

[11] Patent Number: 5,498,026
[45] Date of Patent: Mar. 12, 1996

[54] AIR BAG COVER HAVING A HIDDEN BREAK SEAM

[75] Inventor: Thomas L. Eckhout, Waterford, Mich.

[73] Assignee: Larry J. Winget, Leonard, Mich.

[21] Appl. No.: 410,559

[22] Filed: Mar. 24, 1995

Related U.S. Application Data

[63] Continuation of Ser. No. 140,768, Oct. 20, 1993, abandoned, which is a continuation-in-part of Ser. No. 984,326, Dec. 2, 1992, abandoned.

[51] Int. Cl.$^6$ ................................................ B60R 21/20
[52] U.S. Cl. ........................................................ 280/728.3
[58] Field of Search ........................... 280/728 B, 731, 280/732, 728 A, 728.3

[56] References Cited

U.S. PATENT DOCUMENTS

| | | | |
|---|---|---|---|
| 3,819,205 | 6/1974 | Dunford et al. | 280/731 |
| 4,325,568 | 4/1982 | Clark et al. | 280/731 |
| 4,895,389 | 1/1990 | Pack, Jr. | 280/728 B |
| 4,934,735 | 6/1990 | Embach | 280/731 |
| 5,060,971 | 10/1991 | Nanbu et al. | 280/728 B |
| 5,085,462 | 2/1992 | Gualtier | 280/731 |
| 5,125,683 | 6/1992 | Nakajima | 280/728 B |
| 5,172,931 | 12/1992 | Baba et al. | 280/728 B |
| 5,186,490 | 2/1993 | Adams et al. | 280/731 |
| 5,239,147 | 8/1993 | Allard et al. | 200/61.54 |
| 5,280,946 | 1/1994 | Adams et al. | 280/728 B |
| 5,283,404 | 2/1994 | Prescaro, Jr. | 200/61.54 |
| 5,306,040 | 4/1994 | Leonelli et al. | 280/728 B |
| 5,320,380 | 6/1994 | Hamada et al. | 280/728 B |
| 5,322,324 | 6/1994 | Hansen et al. | 280/732 |
| 5,330,223 | 7/1994 | Hiramitsu et al. | 280/728 B |
| 5,338,060 | 8/1994 | Soderquist | 280/728 B |
| 5,342,086 | 8/1994 | Harris et al. | 280/728 B |
| 5,346,249 | 9/1994 | Hallard et al. | 280/728 B |

FOREIGN PATENT DOCUMENTS

| | | | |
|---|---|---|---|
| 4113591 | 11/1991 | Germany | 280/728 B |
| 0249743 | 10/1990 | Japan | 280/728 B |
| 0143752 | 6/1991 | Japan . | |
| 3136949 | 6/1991 | Japan | 280/728 B |
| 4328051 | 11/1992 | Japan | 280/728 B |
| 5178147 | 7/1993 | Japan | 280/728 B |
| 2244449 | 12/1991 | United Kingdom | 280/728 B |

Primary Examiner—Margaret A. Focarino
Assistant Examiner—Peter C. English

[57] ABSTRACT

A plastic air bag cover for use in an automobile, the air bag cover comprising, a front cover adapted to enclose an uninflated automotive air bag, the front cover having inner and outer surfaces defining a first thickness therebetween and a decorative indicia defined on the outer surface of the front cover and a break seam defined in the inner surface of the front cover for permitting the air bag to inflate and exit the front cover, the break seam further defining a break pattern and having a first wall, a second wall and a break wall connecting the first and second walls, the break wall having inner and outer surfaces defining a second thickness therebetween, wherein the second thickness is less than the first thickness, the break wall and first and second walls are visually imperceptible when viewing the front cover outer surface, and the break seam is substantially non-coincidental with the decorative indicia.

16 Claims, 2 Drawing Sheets

U.S. Patent    Mar. 12, 1996    Sheet 1 of 2    5,498,026
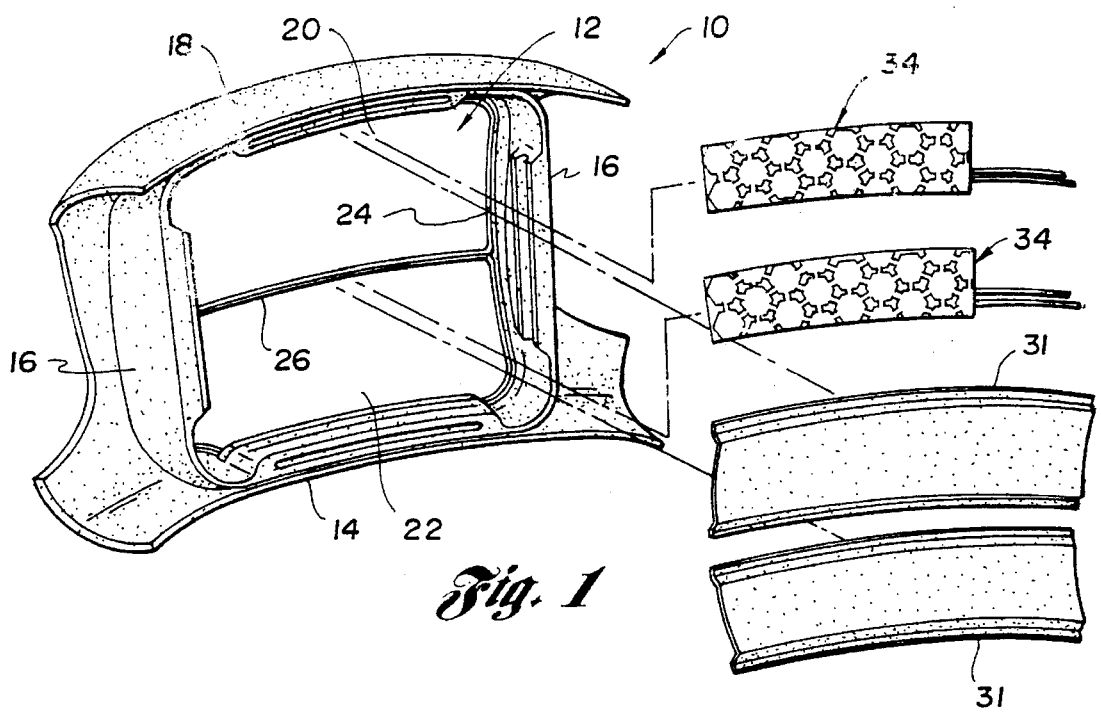
Fig. 1
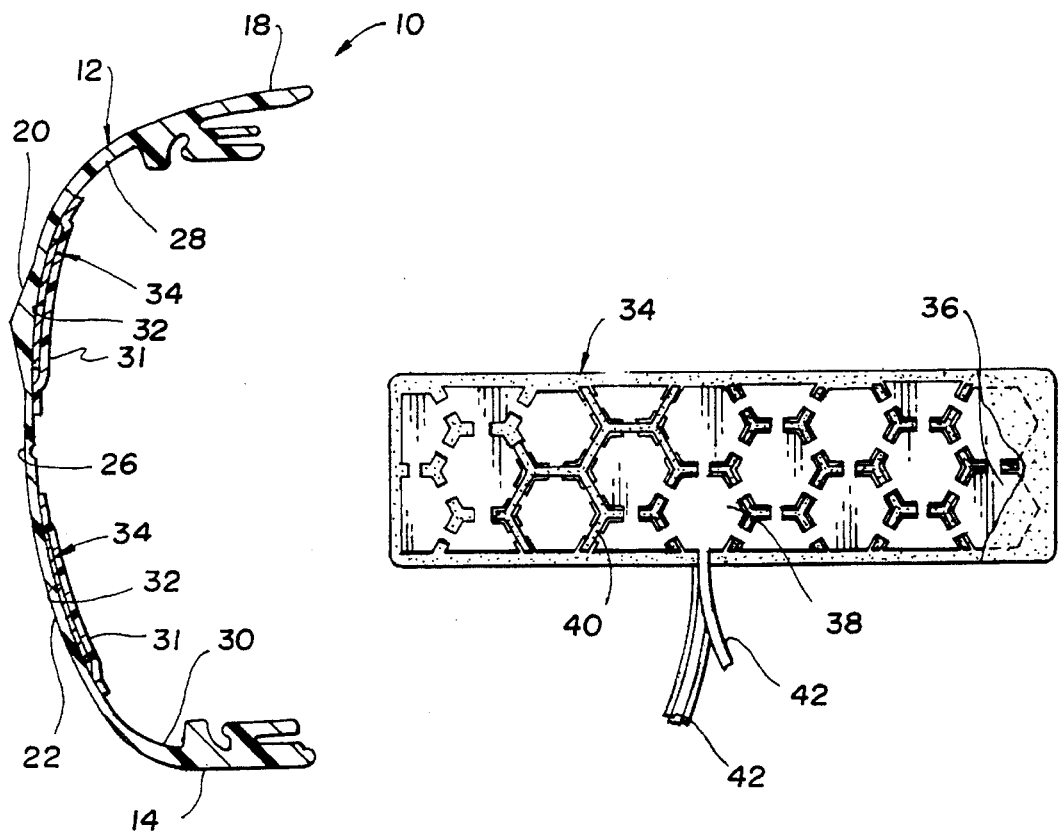
Fig. 2
Fig. 3

AIR BAG COVER HAVING A HIDDEN BREAK SEAM

This is a continuation of application Ser. No. 08/140,768, filed Oct. 20, 1993, abandoned, which is a continuation-in-part of application Ser. No. 07/984,326, filed Dec. 2, 1992, abandoned.

TECHNICAL FIELD

This invention relates to plastic air bag covers and in particular to air bag covers having hidden break seams.

BACKGROUND ART

Presently, when air bag covers are provided in automobiles on the driver side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. Conventional air bag covers used in conjunction with occupant restraint systems often include noticeable or visually perceptible break seams or scores disposed on the exterior surface of the air bag cover. The break seams or scores represent selected weakened surfaces where the inflating air bag initially separates or breaks through the air bag cover and moves away from the steering wheel to perform its safety feature.

U.S. Pat. No. 4,325,568 issued to Clark et al. discloses a modular occupant restraint system including an inflator, a cushion, a container for the cushion and an air bag cover for the container assembled as a module. Clark et al. further discloses use of score lines that are visually perceptible from a front view of the air bag cover as it is operably mounted on the steering wheel of the automobile.

U.S. Pat. No. 5,085,462 issued to Gaultier discloses an air bag and vehicle horn switch assembly. The assembly of Gaultier also discloses use of an air bag cover including visually perceptible exterior break seams or score lines in the operable mounted position within the vehicle.

U.S. Pat. No. 5,186,490 issued to Adams et al. discloses a cover for an inflatable restraint system for a motor vehicle which contains a slot in the upper wall thereof into which a thin or membrane type switch assembly is inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and uninflated air bag forming two structures the air bag must exit to carry out its function.

Current trends in the automotive manufacturing industry are oriented towards providing, clean aesthetically pleasing outer surfaces within the interior of the automobile. Inclusion of extraneous exterior break seams or score lines that are perceptible from an occupant's viewpoint in front of the steering wheel detracts from the overall appearance of the interior of the automobile.

It is also known that the provision of noticeable exterior break seams or score lines that are designed for aesthetic purposes is very difficult to achieve as the final design obtained must satisfy engineering requirements related to inflation and exit of the air bag. Thus, use of visually noticeable exterior outer score lines is limited to known score line designs such as the "H" shaped score lines disclosed in U.S. Pat. No. 5,085,462 to Gualtier.

DISCLOSURE OF THE INVENTION

An object of the present invention is to provide an automotive air bag cover having a break seam for allowing inflation and exit of the air bag from the air bag cover which is visually imperceptible from the outer exposed front surface of the air bag cover.

In carrying out the above objects and other objects of the present invention, an automotive air bag cover constructed in accordance with the present invention is provided. The air bag cover includes a decorative front cover adapted to enclose an uninflated automotive air bag. The front cover has inner and outer surfaces that define a first thickness therebetween. A break seam is further defined in the front cover inner surface for permitting the air bag to inflate and exit the front cover. The break seam includes a first wall, a second wall and a break wall defined therebetween having a second thickness that is less than the first thickness. The break seam provided in accordance with the present invention is visually imperceptible when viewing the exposed front cover outer surface.

Preferably, the break seam first and second walls are annular in shape and the break wall is substantially planar in relation to said first and second annular walls.

Also, preferably, the first and second annular walls are disposed in a convex facing relationship with respect to the break surface.

These and other features and additional objects of the invention will occur to those skilled in the art on reading the following description with reference to the accompanying drawings.

BRIEF DESCRIPTION OF THE DRAWINGS

FIG. 1 is an exploded view of an automotive air bag cover, constructed in accordance with the present invention;

FIG. 2 is a sectional view of the assembled air bag cover of FIG. 1;

FIG. 3 is a top plan view, partially broken away, of the horn switch assembly.

BEST MODE FOR CARRYING OUT THE INVENTION

Figure 4:
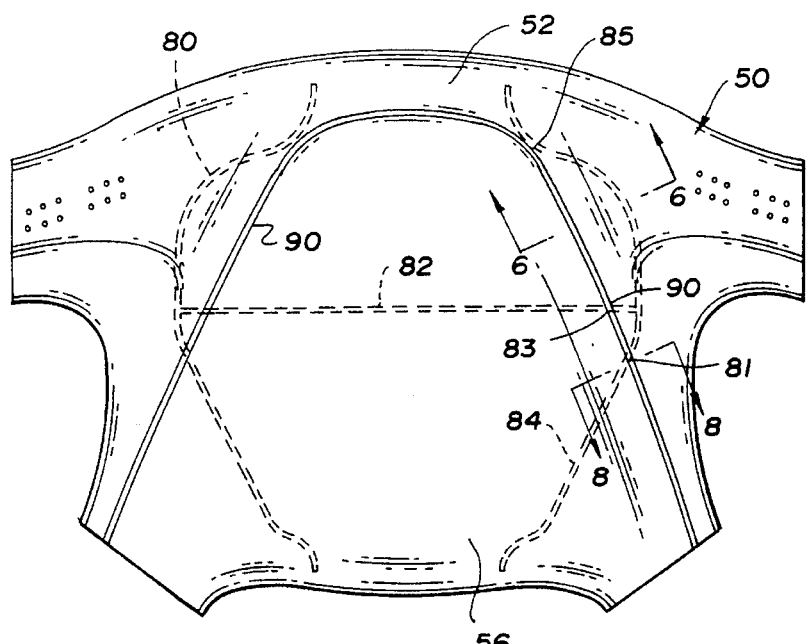
FIG. 4 is a front elevational view of an alternative embodiment of an automotive air bag cover constructed in accordance of the present invention.

Referring now to the drawing FIGURES, there is illustrated in FIGS. 1 and 2, a first embodiment of an automotive air bag cover, generally indicated at 10, constructed in accordance with the present invention. Typically, the automotive air bag cover 10 is secured at the top end of a vehicle drive column (not shown) at the steering wheel of the vehicle.

A front cover, generally indicated at 12 of the air bag cover 10, is integrally formed with side panels 14, 16 and 18. Typically, the side panels 14, 16 and 18 are apertured, as illustrated in FIGS. 1 and 2, to permit the cover 10 to be fixedly secured to the vehicle drive column. An outer surface (not shown) is disposed to face the vehicle operator.

The front and side panels 12, 14, 16, and 18 are adapted to enclose an uninflated automotive air bag (not shown) between the cover 10 and the steering column (not shown).

The front panel 12 includes upper and lower portions 20 and 22, respectively. The upper and lower portions 20 and 22 are interconnected to the side panels 16 at break seams 24 (only one of which is shown in FIG. 1) and to each other at a break seam 26. The break seams 24 and 26 are of reduced thickness, to permit the air bag, as it is inflating, to exert a force at the inner portion of the front panel 12 to cause the upper and lower portions 20 and 22 of the front panel 12 to separate from the side panels 16 along the break seams 24 and to separate from each other along the break seam 26.

The upper portion 20 of the front panel 12 is hingedly connected to the top panel 18 at a hinge 28 and the lower portion 22 of the front panel 12 is hingedly connected to the bottom side panel 14 at a hinge 30, as best shown in FIG. 2. After separation from the side panels 16, the upper and lower portions 20 and 22 of the front panel 18 can swing upwardly and downwardly, respectively, and out of the way of the inflating air bag.

Rear panels 31 are fixedly secured about their periphery to the upper and lower portions 20 and 22 of the front panel 12 at their inner surfaces to move therewith and to form sealed, hollow compartments 32, as best shown in FIG. 2. Preferably, the rear panels 31 are hot plate welded, heat staked or otherwise attached to the upper and lower portions 20 and 22 at their outer periphery adjacent the break seam 26 between the upper and lower portions 20 and 22, respectively, and adjacent the break seams 24. The rear panels 31 do not cover any of the break seams 24 or 26 since this would hinder or possibly prevent separation along the break seams 24 and 26.

The air bag cover 10 preferably includes a pair of horn switch assemblies, generally indicated at 34. Each assembly 34 extends substantially the entire width of the front panel 12 between the side panels 16 within its respective hollow compartment 32.

As illustrated in FIG. 2, each assembly 34 substantially fills its respective hollow compartment 32. As illustrated in FIG. 3, each horn switch assembly 34 includes a pair of spaced flexible, transparent, plastic layers 36. On the inner surface of one of the plastic layers 36, there is formed a matrix layer 38 of interconnected hexagonal pads which forms an electrically conductive inner surface for making a circuit path with a corresponding second electrically conductive inner surface of another matrix of interconnected hexagonal pads formed on the other plastic layer 36. Upon manual actuation of the corresponding portion of the front panel 12, the circuit path is made.

The circuit path is made through an insulator layer 40 which is disposed between and spaces the layers 38 apart so that electrical connection is only made between the hexagonal pads of the layers 38. The insulator layer 40 insulates the interconnecting portions of the electrically conductive inner surfaces of the layers 38 from one another. The insulator layer 40 is preferably made of foam and has a honeycomb structure.

Preferably, the horn switch assemblies 34 are foil switch assemblies cut to size from a mat of material commercially available from Illinois Tool Works, Inc. of Glenview, Ill. Then, electrically conductive leads 42 which are encapsulated in plastic are electrically connected to certain pads of each of the layers 38 at one end thereof and to the automobile's electrical system at the opposite end through a breakaway connection.

Figure 5:
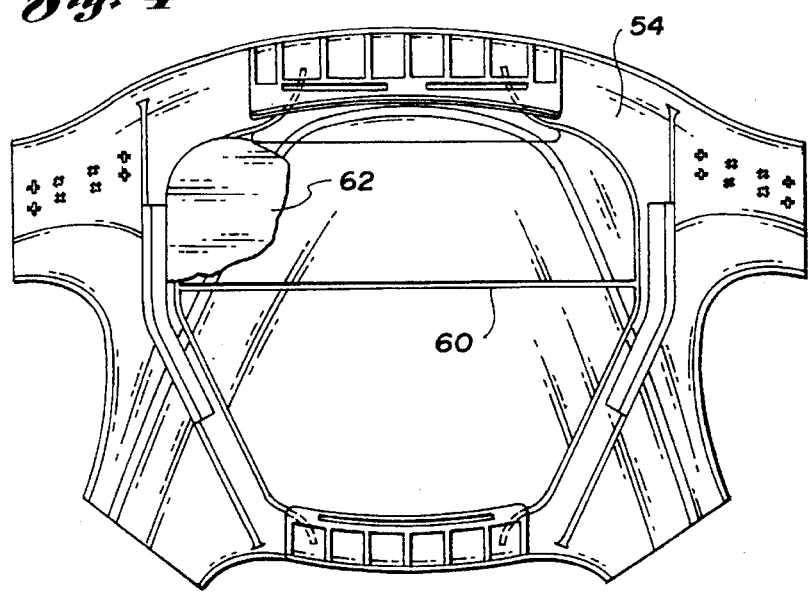
FIG. 5 is a rear elevational view of the alternative embodiment of FIG. 4.
Figure 6:
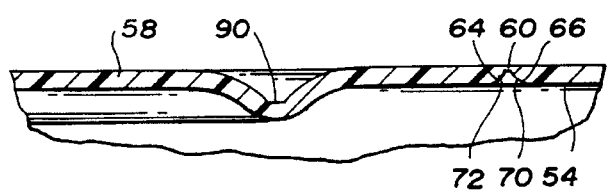
FIG. 6 is a cross sectional view of the air bag cover of the present invention taken along lines 6—6 of FIG. 4.

Referring now to FIGS. 4 and 5, there is shown generally, air bag cover 50, an alternative embodiment constructed in accordance with the present invention. The air bag cover 50 includes a front cover 52 having an inner surface 54 and an outer surface 56. As shown in FIG. 6, the inner and outer surfaces 54 and 56 respectively define the thickness 58 of front cover 52 which is in a range from 2.0 to 6.0 millimeters. The preferred thickness is 4.0 millimeters. The air bag cover 50 is designed to be operably located within the automobile interior (not shown) such that the front cover outer surface 56 is exposed to occupant view.

A weakened area or break seam 60 is shown in FIGS. 4 and 5. The break seam 60 is, as discussed above, necessarily designed to allow inflation and exit of air bag 62 from the air bag cover 50 to permit its safety function between the steering column and operator (not shown). The break seam 60 is therefore designed to be the primary or sole, break area of the air bag cover during inflation and exit of the air bag 62.

Figure 7:
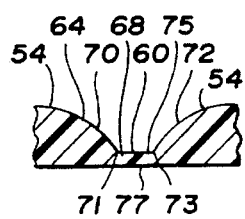
FIG. 7 is an enlarged view of a break seam constructed in accordance with the present invention.

Referring to FIG. 7, the break seam 60 includes, in the preferred embodiment, a first wall 64 and a second wall 66. A break wall 68 extends between the first wall 64 and the second wall 66, a distance of at least 0.3 millimeters. The first and second walls 64 and 66 are each convex in shape and are disposed in a symmetrical, facing relationship with respect to the break wall 68.

More specifically, the first wall has a convex portion 70 that extends from the inner surface 54 of the front cover 52 to the side 71 of the break wall 68. The convex portion 70 is defined in cross section by a curve having a radius in a range from 4.0 to 11.0 millimeters. The preferred range for the radius of the convex portion 70 is between 6.0 and 9.0 millimeters.

Similarly, the second wall 66 has a convex portion 72 that extends from the inner surface 54 of the front cover 52 to the side 73 of the break wall 68. The convex portion 72 is defined in cross section by a curve having a radius in a range from 4.0 to 11.0 millimeters. The preferred range for the radius of the convex portion 72 is between 6.0 and 9.0 millimeters. Additionally, the break wall 68 has an inner surface 75 and an outer surface 77 defining a uniform thickness in a range from 0.2 to 0.9 millimeters, with the preferred thickness being 0.5 millimeters.

Both embodiments of the present invention, air bag cover 10 illustrated in FIG. 1 and air bag cover 50 illustrated in FIG. 5 include a break seam which is visually imperceptible from the exposed outer surfaces of their respective front covers, 12 and 52 respectively. As shown in FIGS. 4, 6 and 7, the break seam constructed in accordance with the present invention provides an outer surface 56 of the front cover which is undisturbed by the inclusion of annular walls 70 and 72, and break wall 68. From the exterior, exposed side of the air bag cover outer surface 56, break seam 60 is visually imperceptible as shown by phantom lines 80, 82 and 84 in FIG. 4.

The air bag cover of the present invention therefor provides a cover which does not require any additional parts or cover-up decorating pieces to afford a clean, aesthetically pleasing outer surface. The common, visually noticeable "U" or "H" shaped designs of the prior art are avoided with the present invention. As such, entirely aesthetic front cover designs can be provided on air bag covers which are unrelated and unaffected by the presence of the break seam 60.

Figure 8:
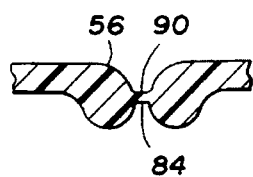
FIG. 8 is an enlarged cross section taken along lines 8—8 of FIG. 4.

For example, in FIGS. 4 and 8, the air bag cover 50 includes a decorative indicia or contour line 90. Contour line 90 is an extending groove which is molded into the air bag cover in the manufacturing process. Conventional air bag covers include different kinds of indicia including grooves, extending ribs and decorative appliques. Contour line 90 is substantially non-coincidental with the hidden break seam lines 80, 82 and 84. As shown in FIG. 4, the contour line 90 intersects with the break seams at points 81, 83, and 85 but does not form any substantial part of the break seam. Similarly, the break seams 80, 82 and 84 do not form any part of the contour line on outer surface 56. The visual aspects of the contour line 90 are completely unaffected by the break seams 80, 82 and 84.

It is preferred that the air bag cover of the present invention be manufactured from a flexible thermoplastic rubber such as commercially available "Santoprene" 201-87 provided by Advance Elastomers Systems of Auburn Hills, Mich. Santoprene is a registered trademark of the Monsanto Company. Santoprene 201-87 is a colorable thermoplastic general purpose elastomer with good fluid resistance which is processable by injection molding and extrusion. In addition, the thickness of the break wall is dependent upon the force exertable on the air bag cover by the inflating air bag.

The tear strength, ultimate tensile strength, hardness, and elasticity of the material are characteristics important to the choice of thermoplastic material used to manufacture the air bag. The preferred thermoplastic material used for manufacture of the air bag cover has a tensile strength in a range from 15.0 to 17.0 Mpa's and more preferably 15.5 to 16.5 Mpa's. The preferred material used has a tear strength in a range from 47 to 51 kN/m at 25 degrees celsius and 21 to 25 kN/m at 100 degrees celsius. The preferred material used has a durometer hardness in a range of 70 to 100 on the Shore A scale, and more preferably in a range of 85 to 90. The above characteristics in conjunction with the structure of the air bag cover satisfy the necessary conditions related to the inflation and exit of the air bag from the cover.

While only certain embodiments of the method and apparatus of the present invention have been shown and described, others may be possible without departing from the scope of the following claims.

I claim:

1. (Amended) A homogeneous thermoplastic air bag cover for use in an automobile, said air bag cover comprising:

a front cover adapted to enclose an uninflated automotive air bag, the front cover having inner and outer surfaces defining a first thickness therebetween; and a break seam defined in said inner surface of said front cover for permitting the air bag to inflate and exit the front cover, said break seam further defining a break pattern and having a first convex wall, a second convex wall and a substantially planar break wall connecting said first and second walls and having a width of at least 0.3 millimeters, said break wall having inner and outer surfaces defining a second thickness therebetween, wherein said second thickness is less than said first thickness, said break pattern being visually imperceptible when viewing from the front cover outer surface.

2. An air bag cover as in claim 1 wherein said first and second walls are disposed in a facing relationship with respect to said break wall inner surface.

3. An air bag cover as in claim 2 wherein said first and second walls are substantially symmetrical about said break wall.

4. An air bag cover as in claim 1 wherein said break seam has a uniform thickness.

5. An air bag cover as in claim 1 wherein said first thickness is in a range from 2.0 to 6.0 millimeters and said second thickness is in a range from 0.2 to 0.9 millimeters.

6. An air bag cover as in claim 1 wherein each of the first and second walls is characterized in cross section by a curved surface having a central radius in a range from 4.0 to 11.0 millimeters.

7. An air bag cover as in claim 1 wherein each of the first and second walls is characterized in cross section by a curved surface having a central radius in a range from 6.0 to 9.0 millimeters.

8. An air bag cover as in claim 1 wherein the plastic is a thermoplastic rubber.

9. An air bag cover as in claim 1 wherein said front cover is formed of a material having a tensile strength in a range from 15.0 to 17.0 MPa.

10. An air bag cover as in claim 1 wherein said front cover is formed of a material having a tensile strength in a range from 15.5 to 16.5 Mpa.

11. An air bag cover as in claim 1 wherein said front cover is formed of a material having a tear strength in a range from 47 to 51 kN/m at 25 degrees celsius and 21 to 25 kN/m at 100 degrees celsius.

12. An air bag cover as in claim 1 wherein said front cover is formed of a material having a tear strength of approximately 49 kN/m at 25 degrees celsius and 23 kN/m at 100 degrees celsius.

13. An air bag cover as in claim 1 wherein said front cover is formed of a material having a durometer hardness ranging from 70 to 100 on the Shore A scale.

14. An air bag cover as in claim 1 wherein said front cover is formed of a material having a durometer hardness ranging from 85 to 90 on the Shore A scale.

15. An air bag cover as in claim 1 wherein said break seam is integrally formed in said inner surface.

16. A homogeneous thermoplastic air bag cover for use in an automobile, said air bag cover comprising:

a thermoplastic rubber front cover adapted to enclose an uninflated automotive air bag, the front cover having inner and outer surfaces defining a first thickness therebetween, and a decorative indicia defined on the outer surface of said front cover, said front cover inner surface adapted to abuttingly engage said uninflated air bag; and a break seam defined in said inner surface of said front cover for permitting the air bag to inflate and exit the front cover, said break seam having a first wall defined in cross section by a first curve having a radius in a range from 4.0 to 11.0 millimeters, a second wall defined in cross section by a second curve having a radius in a range from 4.0 to 11.0 millimeters and a substantially planar break wall connecting said first and second walls and having a width of at least 0.3 millimeters, said break wall being linear in cross section in relation to said first and second walls, said break wall having inner and outer surfaces defining a second thickness therebetween, said second thickness in a range from 0.4 to 0.75 millimeters and wherein the break seam provides an outer surface of the front cover which is undisturbed by the inclusion of the first and second walls and the break wall.

\* \* \* \* \*